(12) United States Patent
Phlegm et al.

(10) Patent No.: US 10,116,018 B2
(45) Date of Patent: Oct. 30, 2018

(54) CURE IN PLACE THERMAL INTERFACE MATERIAL

(71) Applicant: GM Global Technology Operations LLC, Detroit, MI (US)

(72) Inventors: Herman K. Phlegm, West Bloomfield, MI (US); Craig A. Kollar, Sterling Heights, MI (US); Mahmoud H. Abd Elhamid, Troy, MI (US); Timothy J. Fuller, Pittsford, NY (US); Andrew H. Leutheuser, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 240 days.

(21) Appl. No.: 14/990,189

(22) Filed: Jan. 7, 2016

(65) Prior Publication Data
US 2017/0200995 A1    Jul. 13, 2017

(51) Int. Cl.
*H01M 10/6557* (2014.01)
*H01M 10/0525* (2010.01)
*H01M 10/625* (2014.01)
*H01M 10/613* (2014.01)
*H01M 10/617* (2014.01)
(Continued)

(52) U.S. Cl.
CPC ..... *H01M 10/6557* (2015.04); *H01M 2/1077* (2013.01); *H01M 10/0525* (2013.01); *H01M 10/613* (2015.04); *H01M 10/617* (2015.04); *H01M 10/625* (2015.04); *H01M 10/653* (2015.04); *H01M 10/6551* (2015.04); *H01M 10/6555* (2015.04); *H01M 10/6556* (2015.04);
(Continued)

(58) Field of Classification Search
None
See application file for complete search history.

(56) References Cited

U.S. PATENT DOCUMENTS

| 4,509,253 A | * | 4/1985 | Eberle | H01M 2/22 29/623.1 |
| 2009/0127516 A1 | * | 5/2009 | Kotaki | C08G 59/50 252/508 |

(Continued)

FOREIGN PATENT DOCUMENTS

| JP | H09-118738 | * | 10/1995 | ............. C08G 59/18 |
| WO | WO 2012/013789 | * | 2/2012 | ............. H01M 10/50 |
| WO | WO 2017/064978 | * | 4/2017 | ........ H01M 10/6555 |

OTHER PUBLICATIONS

Cambridge Online Dictionary entry of "vibrate" Accessed at https://dictionary.cambridge.org/us/dictionary/english/vibrate on Feb. 8, 2018.*

*Primary Examiner* — Ula C Ruddock
*Assistant Examiner* — Amanda J Barrow
(74) *Attorney, Agent, or Firm* — Quinn IP Law

(57) ABSTRACT

Methods and devices for providing an even distribution of waste heat in a vehicular battery pack, including a battery pack, a cold plate, a coolant reservoir, a support structure between the battery pack and the coolant reservoir, and a conformable thermal interface material for filling the space between cells of the battery pack and the coolant reservoir so as to provide thermal contact between the cells and the coolant reservoir for distributing the waste heat. In addition, methods and devices for providing an even distribution of waste heat and structural support in any heat source to heat sink for applications such as small devices such as computer motors.

6 Claims, 4 Drawing Sheets

(51) Int. Cl.
  *H01M 2/10* (2006.01)
  *H01M 10/653* (2014.01)
  *H01M 10/6556* (2014.01)
  *H01M 10/6551* (2014.01)
  *H01M 10/6555* (2014.01)

(52) U.S. Cl.
  CPC ...... *H01M 2/1022* (2013.01); *H01M 2220/20* (2013.01)

(56) References Cited

U.S. PATENT DOCUMENTS

| | | | | |
|---|---|---|---|---|
| 2009/0208829 A1* | 8/2009 | Howard | .............. | F28D 15/0233 429/120 |
| 2011/0104545 A1* | 5/2011 | Meintschel | ........... | H01M 2/024 429/120 |
| 2011/0318626 A1* | 12/2011 | Bartenschlager | .. | B60H 1/00278 429/120 |
| 2012/0009455 A1* | 1/2012 | Yoon | ................... | H01M 10/653 429/120 |
| 2012/0107663 A1* | 5/2012 | Burgers | .................... | F28F 3/06 429/120 |
| 2013/0337310 A1* | 12/2013 | Omura | ................ | H01M 2/1077 429/120 |
| 2014/0248515 A1* | 9/2014 | Wayne | ................ | H01M 10/647 429/82 |
| 2014/0255749 A1* | 9/2014 | Geise | .................. | H01M 10/653 429/120 |
| 2014/0352870 A1* | 12/2014 | Kanai | ................... | C04B 37/005 156/73.6 |
| 2015/0025176 A1* | 1/2015 | Eagle | .................... | C09J 163/00 523/434 |
| 2015/0111021 A1* | 4/2015 | Yang | ........................ | B32B 27/38 428/220 |
| 2015/0318585 A1* | 11/2015 | Morisaku | ............ | H01M 10/625 429/120 |
| 2016/0020497 A1* | 1/2016 | Biskup | ................ | H01M 10/625 429/120 |
| 2016/0301117 A1* | 10/2016 | Tyler | ................... | H01M 2/1094 |
| 2017/0263987 A1* | 9/2017 | Kopp | ................ | H01M 10/6555 |

\* cited by examiner

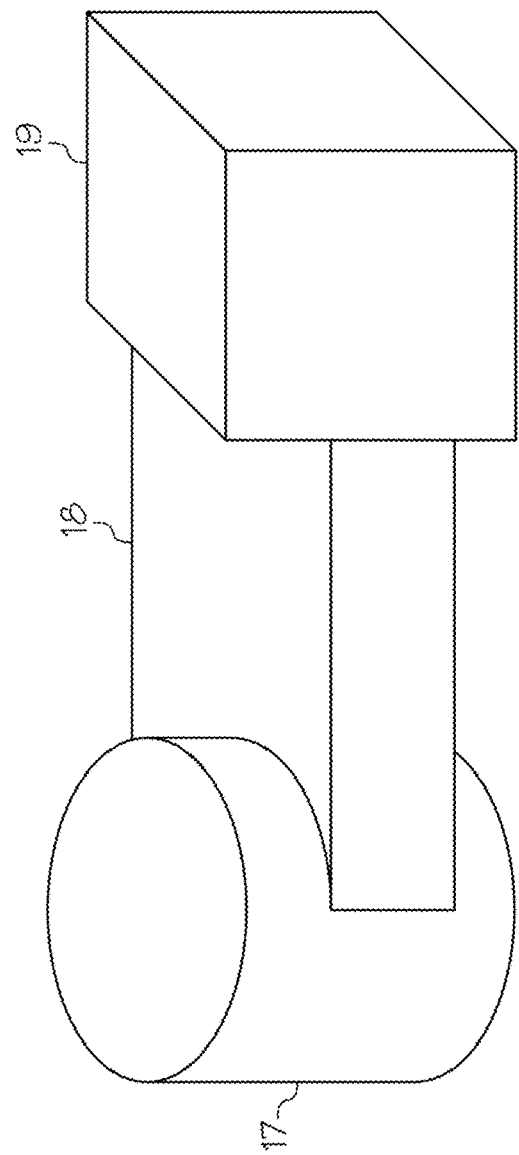

CURE IN PLACE THERMAL INTERFACE MATERIAL

FIELD

This application relates generally to distribution of waste heat in a vehicular battery pack. More specifically, the application relates to methods and devices for allowing the even distribution of the waste heat in the vehicular battery pack or other applications that require heat distribution via a conformable thermal interface material.

BACKGROUND

Battery powered vehicles offer significant advantages over traditional modes of travel. However, multiple technological problems still need to be overcome so as to ensure optimal use of the technology. Current market products are limited, for example, by range of travel, structural soundness, and inefficient removal of the waste heat from the battery packs.

Current systems for battery pack waste heat removal are limited by technological problems, often suffering from brittle materials, cracking, and ineffective contacts that hinder heat transfer. Additionally, there are limits in that currently utilized materials may poorly conform to build variation.

There is a long-felt need in the art for novel systems and methods providing for heat transfer where constant contact between components can be maintained, using materials that meet varying designs and have effective thermal properties so as to provide reliable transfer of the waste heat from the cells of the battery packs.

SUMMARY

Embodiments described herein detail a system for providing an even distribution of waste heat in the vehicular battery pack. The system can include the battery pack, at least one cold plate extending between two cells of the battery pack, and a coolant reservoir coupled to the cold plate via the conformable thermal interface material such that heat can be conducted therebetween. A cold plate can comprise aluminum. In specific embodiments there is a support structure between the battery pack and the coolant reservoir, and the conformable thermal interface material in the form of a liquid or a gel (or a paste or which includes a paste) is placeable within the support structure. The thermal interface material can be a liquid polymer and/or a liquid gel. The conformable thermal interface material can be configured to be flowable so as to fill space between the reservoir and each cell of the battery pack such that there is constant thermal contact between an entire lower surface of each of the cells of the battery pack and a top surface of the coolant reservoir. Upon flowing into the space the conformable thermal interface material can be, for example, from about two to about five millimeters thick, or from about six to about twenty-five millimeters thick. In specific embodiments the conformable thermal interface material maintains the constant thermal contact upon cross-linking, which decreases the flowability of the conformable thermal interface material and provides for the even distribution of the waste heat via conduction of the waste heat from each of the cells of the battery pack to the coolant reservoir. Cross-linking can be performed thermally and/or photochemically. Methods of cross-linking can also include chemical cross-linking such as peroxide curing and catalyst addition; other cross-linking methods include ultraviolet and laser cross-linking.

Additional embodiments described herein provide for a method for providing an even distribution of waste heat from the battery pack in the vehicle via the conformable thermal interface material. Specific embodiments include providing the coolant reservoir and the support structure coupled to the reservoir, and placing the conformable thermal interface material in the form of the liquid or the gel within the support structure. Specific embodiments include placing the bottom surface of the battery pack into the liquid and/or the gel such that the liquid and/or the gel flows around each of the cells of the battery pack such that there is constant thermal contact between the entire lower surface of each of the cells of the battery pack and a surface of the coolant reservoir. The method can also include cross-linking the conformable thermal interface material thereby decreasing the flowability of the conformable thermal interface material and providing for the even distribution of the waste heat via conduction of the waste heat from each of the cells to the coolant reservoir. The liquid or the gel can be used independently or together, and can contain a polymer, and cross-linking can be partial (such about one to about fifty percent) or complete (approximately one-hundred percent). In specific embodiments the cold plates can be coupled to the battery pack prior to introduction of the conformable thermal interface material into the support structure.

BRIEF DESCRIPTION OF THE FIGURES

The following detailed description of specific embodiments can be best understood when read in conjunction with the following drawings, where like structure is indicated with like reference numerals and in which:

FIG. 5 illustrates the use of embodiments in an application where thermal distribution is required for a small heat sink to an external heat sink.

Figure 1:
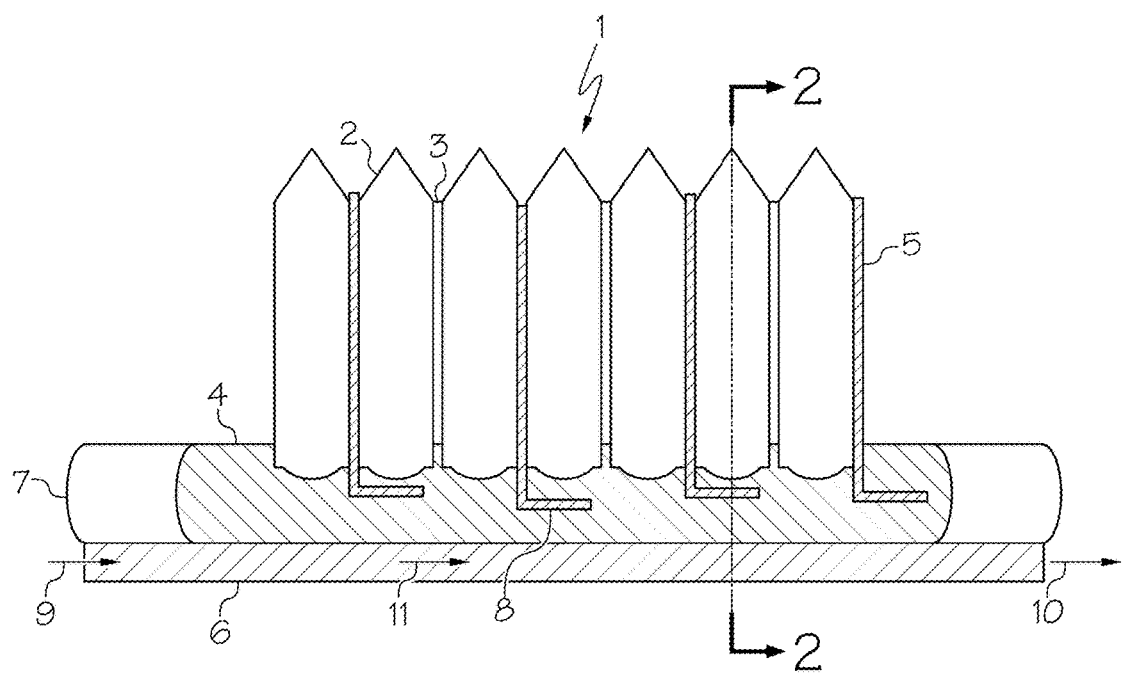
FIG. 1 illustrates a schematic diagram of an embodiment of a system for providing the even distribution of the waste heat in the vehicular battery pack demonstrating the conformable thermal interface material.

The embodiments set forth in the drawings are illustrative in nature and are not intended to be limiting of the embodiments defined by the claims. Moreover, individual aspects of the drawings and the embodiments will be more fully apparent and understood in view of the detailed description that follows.

DETAILED DESCRIPTION

Specific embodiments of the present disclosure will now be described. The invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which embodiments of this invention belong. The terminology used herein is for describing particular embodiments only and is not intended to be limiting of the invention. As used in the specification and appended claims, the singular forms "a," "an," and "the" are intended to include the plural forms as well, unless the context clearly indicates otherwise.

Unless otherwise indicated, all numbers expressing quantities of ingredients, properties such as molecular weight, reaction conditions, and so forth as used in the specification and claims are to be understood as being modified in all instances by the term "about," which is intended to mean up to ±10% of an indicated value. Additionally, the disclosure of any ranges in the specification and claims are to be understood as including the range itself and also anything subsumed therein, as well as endpoints. Unless otherwise indicated, the numerical properties set forth in the specification and claims are approximations that may vary depending on the desired properties sought to be obtained in embodiments of the present invention. Notwithstanding that numerical ranges and parameters setting forth the broad scope of embodiments of the invention are approximations, the numerical values set forth in the specific examples are reported as precisely as possible. Any numerical values, however, inherently contain certain errors necessarily resulting from error found in their respective measurements.

Parts of methods described herein such as mathematical determinations, calculations, inputting of data for computations or determinations of equations or parts thereof can be performed on parts of or one or more computers or computer systems that can include one or more processors, as well as software to run or execute programs and run calculations or computations.

Methods and systems and parts thereof described herein can be combined so as to implement embodiments of the invention. Forms of words used herein can have variations: for example when a word such as "couple" is used, this implies that variations such as "coupled to," and "coupling," and "coupling to" are understood to have been considered. When terms such as "formula," "formulate" and "formulation" are used, all forms of such words have been considered for methods and systems herein.

Within the present context, as used herein, "vehicle" can include a car, truck, van sport utility vehicle (SUV) or the like, and can be all electric, or can include other forms of power such as one or more conventional engines, such one or more internal combustion engines.

Figure 2:
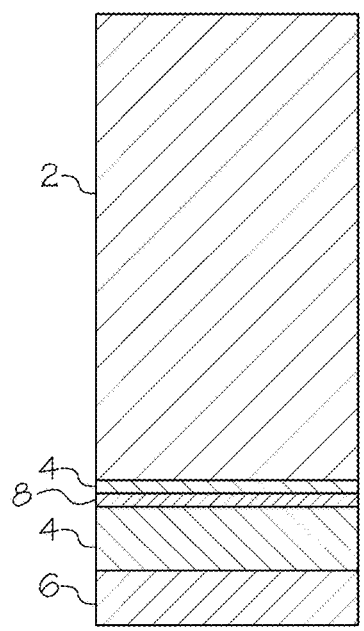
FIG. 2 illustrates a cross-section of the system of FIG. 1 along line 2-2 of FIG. 1.
Figure 3:
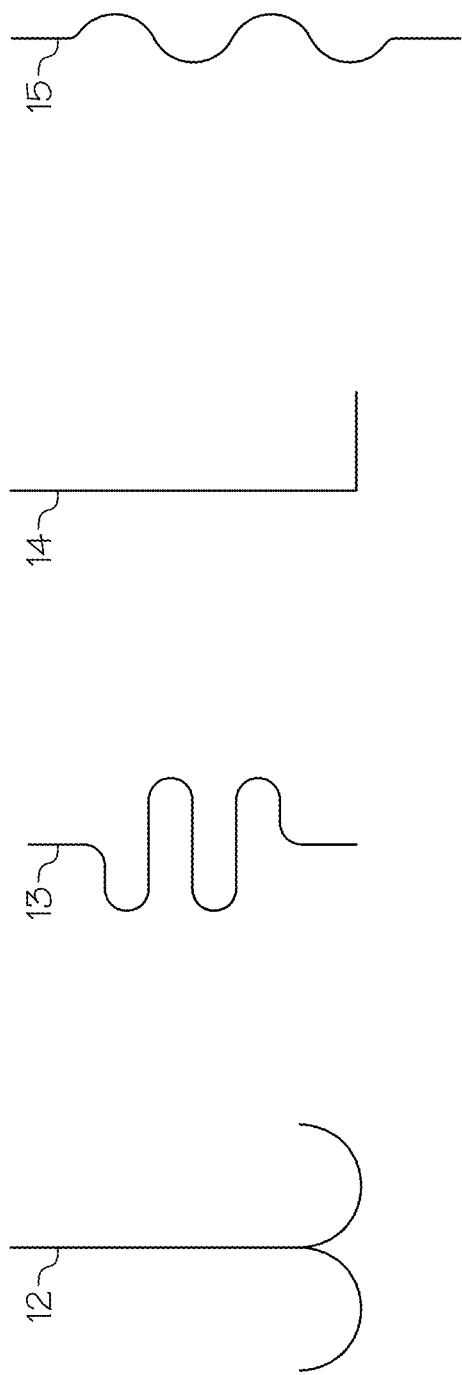
FIG. 3 illustrates example embodiments of cold plate shapes.

FIG. 1 illustrates a schematic diagram of an embodiment of the system 1 for providing an even distribution of waste heat in the vehicular battery pack demonstrating the conformable thermal interface material 4. Also illustrated is the cell 2 of the battery pack; seven cells 2 are shown forming a battery pack, though there can be other numbers of cells 2, such as about one to about ten, or from about one to about thirty, or multiple battery packs of varying numbers of cells 2. Also illustrated is foam 3, such as a strip or strips that can extend between the cells 2, the cold plate top portion 5 (also herein called a solid fin), the coolant reservoir 6, the support structure 7, and the cold plate bottom portion 8. The coolant-in location 9 is illustrated, as is the coolant-out 10 location. In specific embodiments the coolant reservoir 6 has a convective coolant flow in the direction of arrow 11. In specific embodiments the direction of flow can be in the opposing direction. A cross-section of the system of FIG. 1 along line 2-2 is illustrated in FIG. 2. Also illustrated are the cell 2, the coolant reservoir 6, the cold plate bottom portion 8, and the conformable thermal interface material 4 which in specific embodiments flows above and below the cold plate bottom portion 8. In specific embodiments the coolant reservoir carries ethylene glycol mixtures and/or other cooling fluids such as organic refrigerants, phase change materials (such as ammonia) or short chained alcohols (for example, ethanol and/or methanol). If cooled, by gases, air or nitrogen can be used. Flow rates vary depending on cooling media. Typical flow rates for liquids are 10 liters per minute, air cooling rates are typically 200-300 $m^3$/hr. Temperatures for steady state can be about 25 degrees Celsius or less). One or more of the cold plates can have an approximate "L-shape" (FIG. 1) where the bottom portion of the cold plate 8 has a length at the bottom of the "L-shape" (and in line with a longitudinal axis of the coolant reservoir 6) and the top portion 5 of the cold plate has a length at the top of the "L-shape" (and extends between and/or along the outer edge of one or more of the cells 2 along a plane in line with the direction of the cell's height). There can be one or more than one cold plates, such as four or more as shown. A technical difficulty in the art includes getting the cold plates aligned, and embodiments provided herein provide approximately one-hundred percent contact between each of the cells 2 and the coolant reservoir 6 when the cold plates are perfectly aligned (such that the bottom portions 8 of the cold plates form a single plane) as well as when they are not. Regarding the conformable thermal interface material 4, this can flow such that it is all around the bottom portion 8 of one or more of the cold plates, as well as a portion of the top portion 5 of the cold plate. FIG. 3 illustrates example embodiments of cold plate shapes, such as a split-shape 12, spring-fin 13, traditional 14, and wave plate 15; embodiments can have one, more than one, or all of the shapes in a single system 1.

Figure 4:
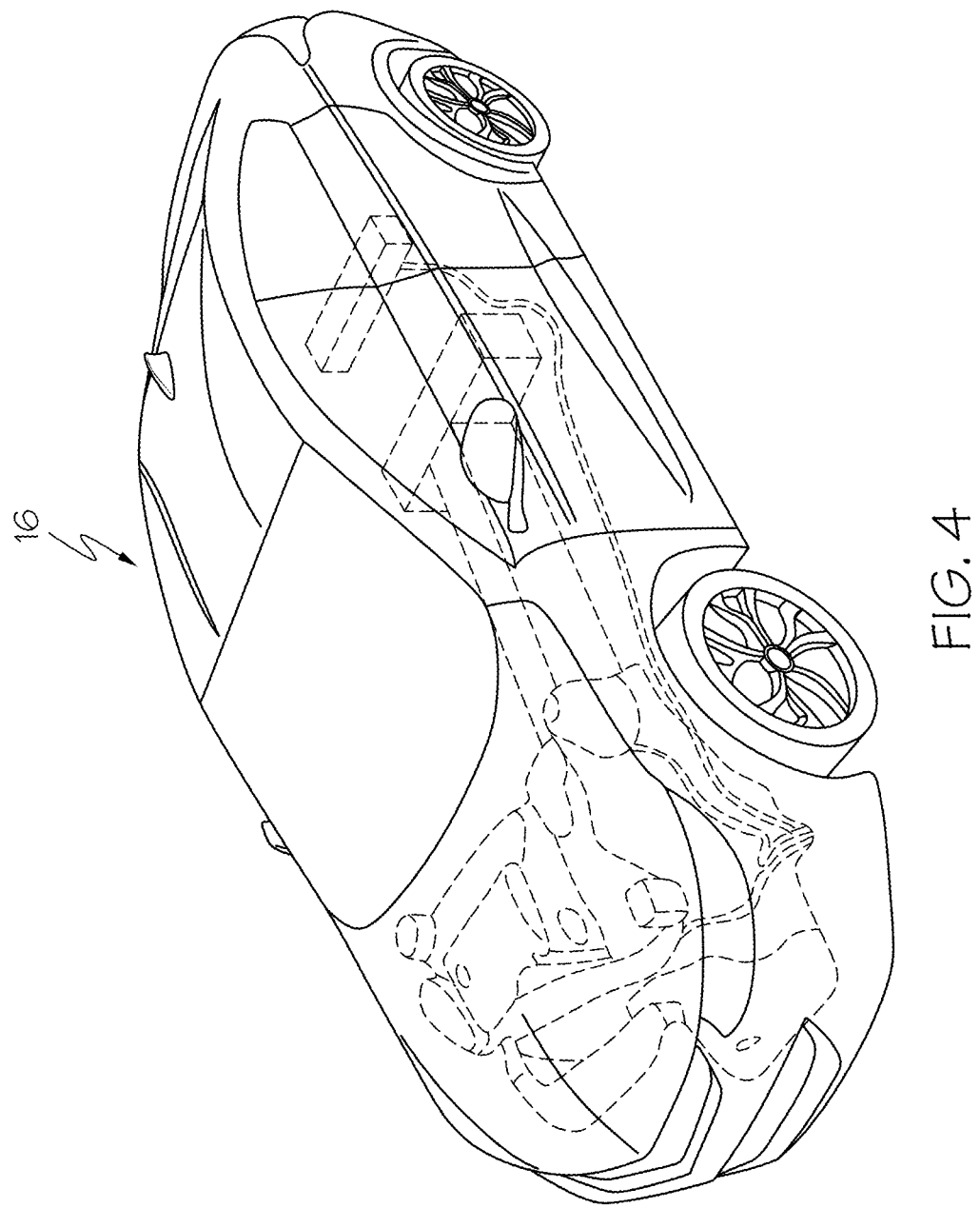
FIG. 4 illustrates the vehicle that can contain therein one or more of the cells of one or more of the battery packs.

FIG. 4 illustrates the vehicle 16 that can contain therein one or more of the cells 2 of one or more of the battery packs. The battery pack or packs can be located in the front, middle, or rear of the car. The battery pack or packs can be coupled to the bottom of the car. Additionally, systems 1 outlined herein can involve cooling in computer applications within and/or outside of the vehicle 16, where thermal conduction is required between interfaces. In specific embodiments the vehicle includes use of the conformable thermal interface material 4 within a system 1 providing power to the vehicle 16, and also includes the thermal interface material 4 within a computer system having a power source and controlling an aspect of the car other than propulsion. FIG. 5 illustrates the use of embodiments in an application where thermal distribution is required for a small heat sink to an external heat sink. Illustrated are a heat source 17, such as a motor, a heat sink 18, and a solid structural interface 19. The solid structural interface 19 can comprise the conformable thermal material 4, which acts as a thermal conductor moving heat away from the source 17 to the solid structural interface 19.

In specific embodiments of systems and methods described herein, the thermal conducting material is part of a formulation comprising the conformable thermal interface material (herein thermal conducting and thermal spreading are terms used synonymously). The formulation can include a combination of one or more of: a condensation polymer (polyvinylidene fluoride, poly(di-methyl siloxane), etc.), a processing aid (fluorosurfactant perfluorononanoic acid), and/or a thermal dissipating agent (such as boron [N]nitride, though this can be used in combination with one or more ceramics) to spread the heat from affected areas in a coating, and a flame retardant The formulations can include one or more (or all) of: a thermally conductive silicone mixture, a thermally conductive epoxy mixture, a thermally conductive Alkyd resin with a styrene solvent mixture, a thermally conductive Kynar® resin, a thermally conductive glue, and/or a thermally conductive polyoctenamer, as outlined below. Some resins described could be loaded with graphite and/or aluminum powders and give high thermal conductivity but can be electrically conductive as well which can entail the use of electrically conductive powders such as graphite, carbon black, aluminum, copper, zinc, silver, or mixtures thereof. The formulations can include one or more of parts or all of the examples provided in the text that follows.

Thermally Conductive Silicone Mixture (that can Include Quick-Sil®)

This mixture is a two part room temperature vulcanizing (RTV) silicone rubber that has a 1 to 2 minute working time and cures in approximately 15 minutes. Part A (or Part B) is kneaded at between 5 and 50 wt. percent (and preferably 33 wt. %) in specific embodiments with alumina, synthetic diamond or boron nitride powder (based on total resin solids) as a thermally conductive additive. Part B (or Part A) is then kneaded quickly with the second component and the putty material is quickly used as a potting material to protect automotive battery cells. The conductive silicone produces 100% solids, tough, strong, flexible, and long-lasting molds with 0% shrinkage.

Thermally Conductive Epoxy Mixture

This mixture is a two-part epoxy resin system (Such as one or more of MasterBond®, Loctite®, Gorilla®, or 3M®, etc.) consisting of an epoxy resin and hardener that can be kneaded as an individual component or as a mixture of the components with between 5 and 50 wt. percent (and preferably 33 wt. %) in specific embodiments with alumina, synthetic diamond or boron nitride powder (based on total resin solids) as a thermally conductive additive. The putty material can be quickly used as a potting material to protect automotive battery cells. The thermally conductive epoxy resin produces 100% solids, tough, strong, flexible, and long-lasting molds with low shrinkage.

Thermally Conductive Alkyd Resin with Styrene Solvent Mixture

This mixture is an unsaturated polyester (such as a fumaric acid-ethylene glycol based polyester or a propoxylated bisphenol-A fumarate resin) or other styrene soluble alkyd polyester resins (3M®, Kao®, Oxychem®, etc.) that can be mixed with styrene monomer to form a paste and then methylethylketone peroxide is added. The putty can be kneaded at between 5 and 50 wt. percent (and preferably 33 wt. %) in specific embodiments with alumina, synthetic diamond or boron nitride powder (based on total resin solids) as a thermally conductive additive. The putty material can be quickly used as a potting material to protect automotive battery cells. The thermally conductive mixture produces 100% solids, tough, strong, flexible, and long-lasting molds with low shrinkage.

Thermally Conductive Kynar® Resin

This resin is a polyvinylidene fluoride copolymer (Arkema®, Kynar® 2751) that can be mixed with acetone (50 wt. % solids) to form a paste and then is kneaded at between 5 and 50 wt. percent (and preferably 33 wt. %) in specific embodiments with alumina, synthetic diamond or boron nitride powder (based on total resin solids) as a thermally conductive additive. The putty material can then be used as a potting material to protect automotive battery cells. The thermally conductive mixture produces tough, strong, flexible, and long-lasting molds with low shrinkage.

Thermally Conductive Booger Glue®

A brick of Booger Glue® or credit card glue (polyisobutylene) can be kneaded at between 5 and 50 wt. percent (and preferably 33 wt. %) in specific embodiments with alumina, synthetic diamond or boron nitride powder (based on total resin solids) as a thermally conductive additive. The mixture can then used as a potting material to protect automotive battery cells. The thermally conductive mixture produces 100% solids, tough, strong, flexible, and long-lasting molds with low shrinkage.

Thermally Conductive Polyoctenamer

Cyclooctene (Aldrich) and a catalyst are in specific embodiments combined at between 5 and 50 wt. percent (and preferably 33 wt. %) in specific embodiments with alumina, synthetic diamond or boron nitride powder (based on total resin solids) as a thermally conductive additive. The catalyst in specific embodiments is a ring opening metathesis polymerization catalyst (such as Grubb's® catalyst). The mixture can then be used as a potting material to protect automotive battery cells. The thermally conductive mixture produces 100% solids, tough, strong, flexible, long-lasting, and rubbery molds with no shrinkage.

Pastes can be utilized, and example thermal conductivities of example pastes are provided in Table 1, below. In specific embodiments the thermal conductivity of the paste is about 2.5 Watt/m.K. In specific embodiments, the conductivity can be between about 2.5 and about 11.3 Watt/m.K.

TABLE 1

| Material | Thermal conductivity, Watt/m · K |
|---|---|
| Silicone with 10% boron nitride | 4.28 |
| Silicone with 33% boron nitride | 5.54 |
| Silicone with 50% boron nitride | 8.58 |
| Kynar ® with 50% boron nitride | 7.92 |
| Alkyd Resin with Styrene Solvent Mixture with 33% boron Nitride | 7.18 |
| Alkyd Resin with Styrene Solvent Mixture with 33% synthetic diamond (3.5 micron) | 10.03 |
| Alkyd Resin with Styrene Solvent Mixture with 33% (equal weights of synthetic diamond + boron nitride) | 11.3 |

The conformable thermal interface material can be part of a formulation comprising one or more of polyvinylidene fluoride, boron nitride, melamine, a processing aid, and a ceramic. In specific embodiments, the formulation comprises, by weight fraction: from about 0.65 to about 0.75 polyvinylidene fluoride; from about 0.10 to about 0.15 boron nitride; from about 0.05 to about 0.10 melamine; and from about 0.05 to about 0.1 the processing aid and the ceramic combined. In specific embodiments boron nitride is used having a heat transfer coefficient of about 1700 watts per square meter Kelvin. Other materials such as synthetic diamond and an aluminum oxide can be used as well.

In yet other embodiments of systems and methods described herein, the conformable thermal interface material is part of a formulation comprising one or more of polydimethylsiloxane, boron nitride, melamine, a processing aid, and a ceramic. In specific embodiments the formulation comprises, by weight fraction: from about 0.1 to about 50 percent boron nitride; from about 0.05 to about 0.10 percent melamine; from about 0.05 to about 0.1 percent the processing aid and the ceramic combined; and the remaining balance in specific embodiments is polydimethylsiloxane.

In specific embodiments one or more or any of the formulations described herein can have one or more of: alkyds, polyisobutylene, epoxy resin or resins, polyurethanes (foams), and polycycloolefins.

In other specific embodiments of systems and methods described herein the battery pack comprises Lithium-Ion cells. Embodiments can also comprise prismatic pouch and/or can-type cells.

Specific systems and methods described herein can comprise shaking and/or vibrating the system to distribute the conformable thermal interface material. For example in specific embodiments the shaking and/or the vibrating can be performed after the placing of the conformable thermal interface material into the support structure and before the cross-linking. In specific embodiments the cross-linking is performed, thus decreasing of the flowability of the conformable thermal interface material. In specific embodiments the decrease in flowability is such that the cross-linked thermal interface material forms a solid and in specific embodiments can provide support structure for the battery pack. As used herein, a solid would refer to a complete cross-linking of the liquid or gel such that a solid forms, and would indicate a fully cured liquid or gel. In specific embodiments, measure of cure is measured by sampling the material and testing on a nuclear magnetic resonance machine to give a degree of cure. Flowability can be performed before the material is cross linked with a dynamic mechanical analyzer.

In yet other specific embodiments of systems and methods described herein a release liner can be placed on the reservoir. In specific embodiments the release liner is placed on the reservoir prior to the placing of the conformable thermal interface material onto the top of the coolant reservoir and/or into and/or on the support structure. In yet other specific embodiments, systems and methods described herein comprise the conformable thermal interface material being physically removable from the system and/or the release liner (either directly away from the release liner or the release liner itself being removable from the system with the conformable thermal interface), and/or the step of removing the thermal interface and/or the release liner (such as a thin polymer film or films, for example in specific embodiments one ore more of polyethylene, or polyethylene terephthalate). In specific embodiments the release liner is about 100 micrometers in thickness, and in other embodiments it is from about 75 to about 125 micrometers thick. The removability could be for service involving one or more of the cells.

Specific embodiments provided herein include a polymer matrix. As used herein, polymer matrix refers to a mixture with polymers.

Specific embodiments use one or more methods or parts of systems described herein in combination with one or more of an acrylic base ceramic or silicone base.

What is claimed is:

1. A method for providing an even distribution of waste heat from a battery pack comprising cells in a vehicle via a conformable thermal interface material comprising:
   providing:
      a coolant reservoir; and
      a support structure coupled to the reservoir;
   placing a release liner on the coolant reservoir;
   placing, after placing the release liner on the coolant reservoir, the conformable thermal interface material in the form of a liquid or a gel within the support structure;
   placing a bottom surface of the battery pack into the liquid or the gel such that the liquid or the gel flows around each of the cells of the battery pack such that there is constant thermal contact between an entire lower surface of each of the cells of the battery pack and a surface of the coolant reservoir;
   cross-linking the conformable thermal interface material thereby decreasing the flowability of the conformable thermal interface material and providing for the even distribution of the waste heat via conduction of the waste heat from each of the cells to the coolant reservoir; and
   removing the conformable thermal interface material by physically removing the release liner.

2. The method of claim 1, further comprising, after the placing of the conformable thermal interface material and before the cross-linking, shaking the support structure to distribute the conformable thermal interface material.

3. The method of claim 1, further comprising, after the placing of the conformable thermal interface material and before the cross-linking, vibrating the support structure to distribute the conformable thermal interface material.

4. The method of claim 1, wherein the conformable thermal interface material is part of a formulation, the formulation further comprising polyvinylidene fluoride, boron nitride, melamine, a processing aid, and a ceramic.

5. The method of claim 1, wherein the conformable thermal interface material is part of a formulation, the formulation further comprising polydimethylsiloxane, boron nitride, melamine, a processing aid, and a ceramic.

6. The method of claim 1, wherein the decreasing of the flowability of the conformable thermal interface material is such that the cross-linked thermal interface material forms a solid and provides structural support for the battery pack.

* * * * *